(12) United States Patent
Rasmussen et al.

(10) Patent No.: US 7,129,846 B2
(45) Date of Patent: Oct. 31, 2006

(54) DE-ICING INFORMATION SYSTEM

(75) Inventors: Roy Martin Rasmussen, Boulder, CO (US); Frank W. Hage, Boulder, CO (US); Rondal K. Moore, Aurora, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 227 days.

(21) Appl. No.: 10/924,569

(22) Filed: Aug. 24, 2004

(65) Prior Publication Data

US 2005/0082435 A1    Apr. 21, 2005

Related U.S. Application Data

(60) Provisional application No. 60/497,583, filed on Aug. 25, 2003.

(51) Int. Cl.
*G08B 19/02*    (2006.01)

(52) U.S. Cl. .................. 340/580; 340/601; 244/134 R

(58) Field of Classification Search ................ 340/580
See application file for complete search history.

(56) References Cited

U.S. PATENT DOCUMENTS

| | | | | |
|---|---|---|---|---|
| 5,104,068 A | * | 4/1992 | Krilla et al. | 244/134 R |
| 5,386,968 A | * | 2/1995 | Coffey et al. | 252/70 |
| 5,474,261 A | * | 12/1995 | Stolarczyk et al. | 340/582 |
| 5,523,959 A | * | 6/1996 | Seegmiller | 340/580 |
| 5,744,711 A | | 4/1998 | Rasmussen et al. | |
| 5,772,153 A | * | 6/1998 | Abaunza et al. | 340/582 |
| 5,772,912 A | * | 6/1998 | Lockyer et al. | 252/70 |
| 5,850,619 A | | 12/1998 | Rasmussen et al. | |
| 6,546,353 B1 | * | 4/2003 | Hallett et al. | 702/130 |
| 6,820,841 B1 | * | 11/2004 | Mittereder et al. | 244/134 R |

FOREIGN PATENT DOCUMENTS

WO    WO 2004/018291 A1    3/2004

OTHER PUBLICATIONS

Rasmussen, Roy, et al., "Weather Support to Deicing Decision Making (WSDDM): A Winter Weather Nowcasting System," Bulletin of the American Meterological Society, vol. 82, No. 4, Apr. 2001, XP-001204544, pp. 579-595.

"Transport Canada Holdover Time (HOT) Guidelines," Winter 2001-2002 XP-002311604, Internet Article, 'Online' retrieved from the Internet: URL:http://206.222.76.45/tables/HOT_2001-02E.pdf.

* cited by examiner

*Primary Examiner*—Daniel Wu
*Assistant Examiner*—Eric M. Blount
(74) *Attorney, Agent, or Firm*—The Ollila Law Group LLC

(57) ABSTRACT

A de-icing information system processes weather data indicating precipitation rate and temperature to determine a check time for a de-icing fluid. The de-icing fluid remains effective if applied after the check time, and the de-icing fluid may not remain effective if applied before the check time. The de-icing information system transfers the de-icing information indicating the check time.

49 Claims, 3 Drawing Sheets

DE-ICING INFORMATION SYSTEM

RELATED CASES

This application claims the benefit of U.S. provisional application 60/497,583 filed Aug. 25, 2003, entitled, "De-Icing Information System," which is hereby incorporated by reference into this application.

GOVERNMENT RIGHTS

The invention was made with Government support under Agreement No. TFA01-03-C00049 awarded by the Federal Aviation Administration. The Government has certain rights in this invention.

BACKGROUND OF THE INVENTION

1. Field of the Invention

The invention is related to the field of de-icing, and in particular, to a system that can provide information to assist airport de-icing operations.

2. Statement of the Problem

During inclement weather, ice forms on airplanes as they wait to take-off. The ice adversely affects the flight performance of the airplanes, and may lead to airplane crashes. To prevent this dangerous ice formation, airport personnel apply de-icing fluid to airplanes waiting to take-off during inclement weather. The de-icing fluid effectively prevents dangerous ice formation for a time period after the treatment—referred to as the holdover time. Thus, the holdover time is the time period between a de-icing treatment and the time when the de-icing treatment becomes ineffective and allows ice to form.

It is critical that an airplane take off during its holdover time. If the airplane takes off during its holdover time, then the de-icing treatment remains effective and prevents dangerous ice formation before take off (after take off, the airplane has other means of controlling ice formation). If the airplane cannot take off during its holdover time, then the de-icing treatment loses its effectiveness before take off, and dangerous ice may form on the airplane before take off. In this case, the airplane should return for a second de-icing treatment. It should be appreciated that the accurate calculation and tracking of the holdover time is crucial to airline safety during inclement weather.

Airport personnel use a table like the one below to manually estimate the holdover time. Airport personnel manually enter the left side of the chart based on a temperature range to arrive at a row in the holdover time section of the chart. Airport personnel manually enter the top of the chart based on current weather conditions to arrive at a column in the holdover time section of the chart. The intersection of the row and column yields the holdover time.

| TEMP (F.) | HOLDOVER TIME (MIN) | | | | | |
|---|---|---|---|---|---|---|
| | FREEZING FOG | FREEZING DRIZZLE | FREEZING RAIN | LIGHT SNOW | MODERATE SNOW | HEAVY SNOW |
| ≧27 | 11–17 | 9–13 | 2–5 | 11–16 | 6–11 | NO |
| 21–27 | 8–14 | 7–10 | 2–5 | 8–13 | 5–8 | GUIDE |
| 14–20 | 6–10 | 5–9 | 2–5 | 6–10 | 4–6 | LINE |
| <14 | 5–9 | NO GUIDELINE | | 4–6 | 2–4 | |

The National Weather Service indicates current weather conditions, such as snow, freezing fog, freezing drizzle, or freezing rain. Airport personnel use these indications to manually enter the top of the chart. For snow however, airport personnel must estimate whether the snowfall rate is light, medium, or heavy.

Airport personnel estimate the snowfall rate based on visibility. To assess visibility, various targets are placed at various distances (¼ mile, ½ mile, ¾ mile, 1 mile, and 1¼ mile). A trained observer determines the furthest target that they can see to establish a visibility distance. For example, if the furthest target that can be seen is the ¾ mile target, then visibility is ¼ mile.

Airport personnel use a table like the one below to manually estimate the snowfall rate based on the visibility estimate. Airport personnel manually enter the left side of the chart based on whether it is day or night. Airport personnel then branch through the chart based on a temperature range to arrive at a row in the visibility section of the chart. Airport personnel manually enter the top of the visibility section of the chart based on the visibility estimate described above to arrive at a column in the visibility section of the chart. The intersection of the row and column yields the snowfall intensity as light, moderate, or heavy, which is used to enter the top of the table described above.

| DAY/NIGHT | TEMP (F.) | VISIBILITY (MILE) | | | | |
|---|---|---|---|---|---|---|
| | | ≧1¼ | 1 | ¾ | ½ | ≦¼ |
| DAY | ≦30 | LIGHT | LIGHT | LIGHT | MODERATE | HEAVY |
| DAY | >30 | LIGHT | LIGHT | MODERATE | HEAVY | HEAVY |
| NIGHT | ≦30 | LIGHT | LIGHT | MODERATE | HEAVY | HEAVY |
| NIGHT | >30 | LIGHT | MODERATE | HEAVY | HEAVY | HEAVY |

There are numerous problems associated with the current technique. One problem is the use of airport personnel to manually determine holdover times. This manual approach is prone to human error. The trained observer could inaccurately assess visibility, or the airport personnel could incorrectly use the tables—either of which could provide an incorrect holdover time. An incorrect holdover time could result in a disastrous attempt by an airplane to take-off with icy wings.

Another problem is the use of various ranges to estimate and characterize the holdover time. Snowfall intensity and temperature only have the resolution of a few ranges. The holdover time itself is expressed in ranges, and for heavy snow, no holdover time is given at all. These ranges do not provide the precise data that is required for highly accurate decision making. In addition, the rough ranges may be open to incorrect interpretations by airport personnel. The use of rough ranges clearly results in vague holdover time estimates. In the worst case, an airplane may take off with icy wings due to a vague estimate. More likely is that an airplane is returned for an unnecessary second de-icing treatment, because the holdover time estimate was too conservative. In this case, the airplane is de-iced again even though the initial de-icing treatment is still effective.

Another problem is the use of visibility to estimate snowfall intensity. The visibility estimate only provides a rough estimate of snowfall as light, moderate, or heavy, and does not provide the resolution required to determine more accurate holdover times. The use of a trained observer to manually estimate visibility is also open to human error. In addition, visibility is different at night than during the day, due to the scattering difference between sunlight and an artificial light source that is used at night. The heavy scattering of sunlight reduces visibility, but the same heavy scattering does not occur with the artificial light source, so a trained observer using an artificial light source at night perceive better visibility than they would during the day given the same snowfall intensity. The result is an inconsistency between visibility assessments at night versus the same assessments during the day. This inconsistency may lead to incorrect holdover time estimates.

Further complicating matters is the fact that various de-icing fluids are typically available for selection and use by airport personnel. The different de-icing fluids have differing costs, with the more effective de-icing fluids costing more. For example, a base de-icing fluid may be diluted with water to form various de-icing mixtures. The mixtures with a high concentration of de-icing fluid are more effective, but they are also more expensive. For each de-icing fluid (or de-icing fluid mixture), there is a corresponding table to provide holdover time estimates.

Airport personnel must manually select the appropriate de-icing fluid to use. The selection of the de-icing fluid is based on the holdover time estimates for the various fluids, and the expected delay for the airplanes between de-icing and take-off. As the de-icing fluids can be relatively expensive, the selection of an overly effective de-icing fluid wastes money, because the airplanes take-off well before the de-icing fluid loses effectiveness, and a cheaper de-icing fluid could have been used. The selection of an ineffective de-icing fluid can have disastrous consequences if ice forms on the airplane before take off.

The selection of de-icing fluids is a complex problem that is exacerbated by the other problems described above. The selection of de-icing fluids is based on holdover time estimates that are fairly vague and open to interpretation as described above. Both the estimate of holdover times and fluid selection are manual, and thus, prone to human error.

Another problem is posed by the fact that inclement weather conditions often change dramatically. Consider an example where the proper de-icing fluid is selected and applied to an airplane to provide a holdover time of 8–13 minutes. Now consider that after the de-icing treatment, snowfall intensity increases dramatically, and because of this change in weather conditions, the holdover time estimate is no longer accurate. The current system has no effective mechanism to handle such changed conditions, and it is possible that the airplane would take off with icy wings based on a holdover time estimate that is no longer accurate given the changed conditions.

In a contrasting example, the snowfall intensity may decrease dramatically after de-icing, but airport delays may prevent the airplane from taking off before the holdover time expires. Because the holdover time expired, the airplane would likely be returned for a second de-icing treatment even though the first de-icing treatment was still effective due to the milder weather conditions. The second de-icing treatment is unnecessary adds unwanted cost and delay to airline travel.

SUMMARY OF THE SOLUTION

Examples of the invention include de-icing information systems, methods of de-icing information system operation, and software products for de-icing information systems. In some examples of the invention, a de-icing information system comprises a processing system and an interface. The processing system is configured to process weather data indicating precipitation rate and temperature to determine a check time for a de-icing fluid, wherein the de-icing fluid remains effective if applied after the check time, and wherein the de-icing fluid may not remain effective if applied before the check time. The interface is configured to receive the weather data and configured to transfer de-icing information indicating the check time.

In some examples of the invention, the de-icing information system further comprises at least one weather sensor configured to detect the precipitation rate and the temperature and to transfer the weather data indicating the precipitation rate and the temperature.

In some examples of the invention, the weather sensor is configured to detect and transfer the weather data at least once per minute.

In some examples of the invention, the weather sensor includes at least one hot plate precipitation rate sensor.

In some examples of the invention, the de-icing information system further comprises a device configured to receive and display the de-icing information.

In some examples of the invention, the display of the de-icing information indicates the check time, the present time, and the holdover time.

In some examples of the invention, the display of the de-icing information indicates the de-icing fluid type and concentration.

In some examples of the invention, the display of the de-icing information indicates the precipitation rate and the temperature.

In some examples of the invention, the display of the de-icing information indicates at least one of: dew point, humidity, wind speed, and wind direction.

In some examples of the invention, the display of the de-icing information indicates at least one of: precipitation intensity, precipitation trend, precipitation type, and precipitation accumulation.

In some examples of the invention, the display of the de-icing information indicates the precipitation rate plotted over time.

In some examples of the invention, the display is located in an airplane cockpit.

In some examples of the invention, the display is located in a de-icing facility.

In some examples of the invention, the display is located in an airport control tower.

In some examples of the invention, the processing system is configured to select the de-icing fluid.

In some examples of the invention, the processing system is configured to select the de-icing fluid based on forecasted weather data.

In some examples of the invention, the processing system is configured to generate an alarm if the de-icing fluid was applied before the check time.

DESCRIPTION OF THE DRAWINGS

The same reference number represents the same element on all drawings.

DETAILED DESCRIPTION OF THE INVENTION

Figure 1:
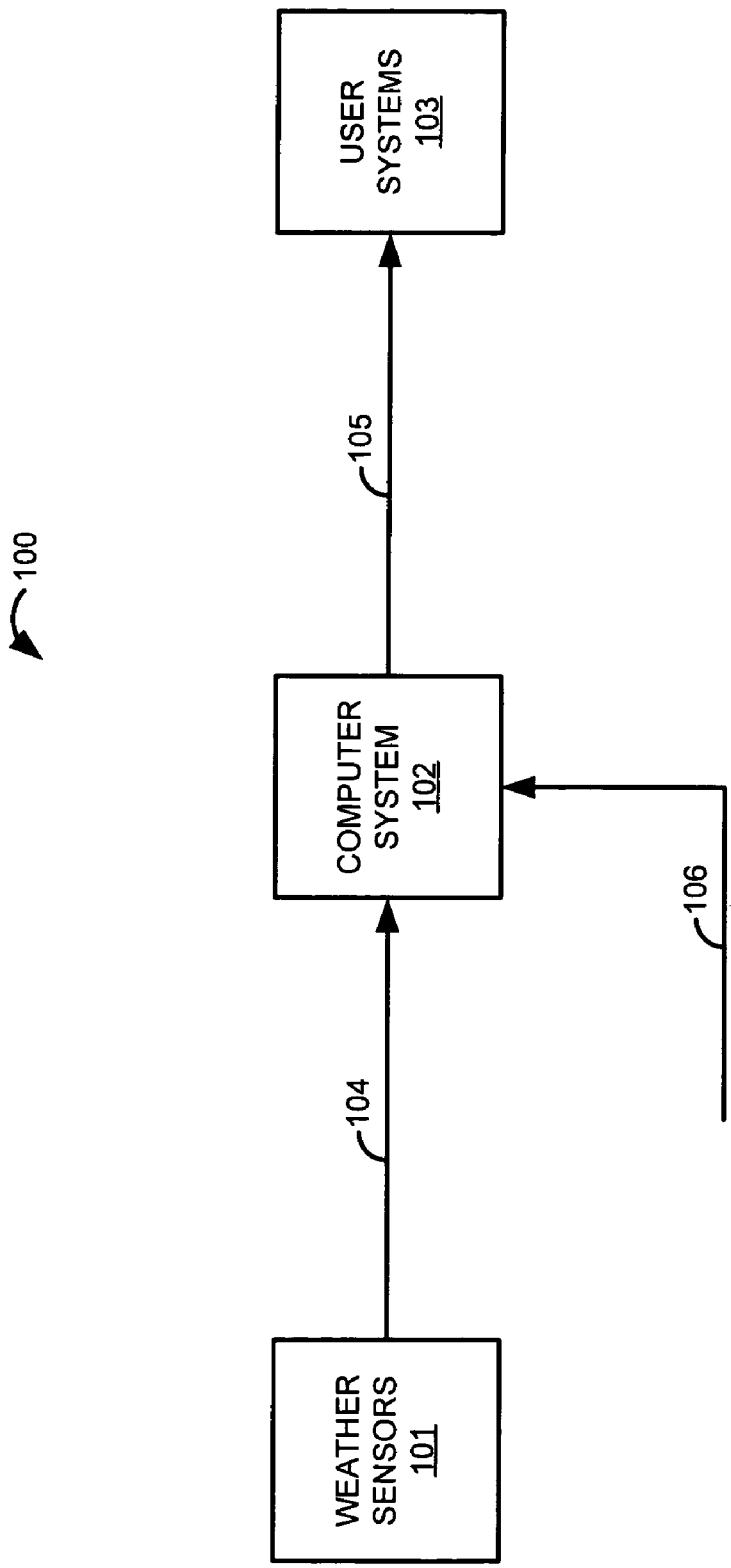
FIG. 1 illustrates an aircraft de-icing information system in an example of the invention.
Figure 2:
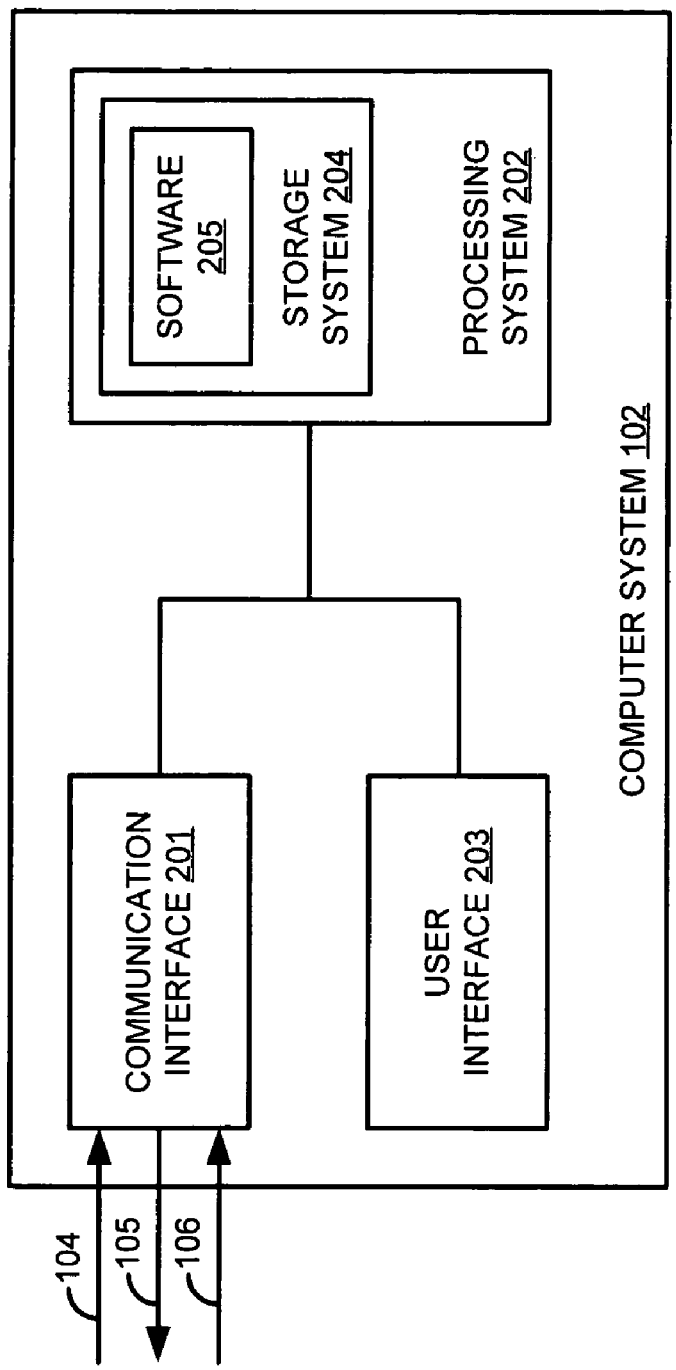
FIG. 2 illustrates a computer system in an example of the invention.
Figure 3:
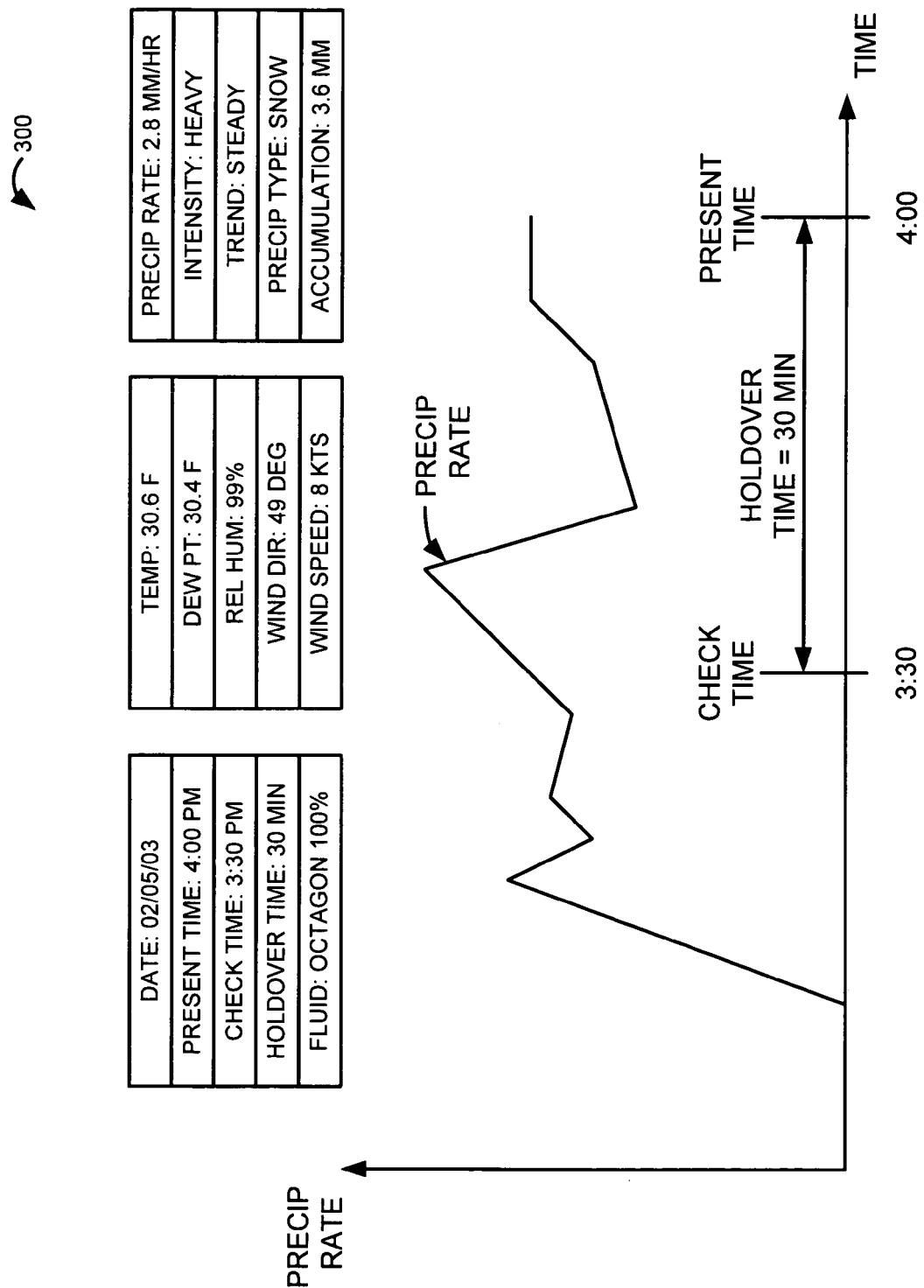
FIG. 3 illustrates a screen display in an example of the invention.

FIGS. 1–3 and the following description and exhibits depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

System Configuration—FIGS. 1–2

FIG. 1 illustrates aircraft de-icing information system 100 in an example of the invention. Aircraft de-icing information system 100 includes weather sensors 101, computer system 102, user systems 103, and communication links 104–106. Weather sensors 101 transfer weather data to computer system 102 over link 104. Computer system 102 transfers de-icing information to user systems 103 over link 105. A weather information service (not shown) may also transfer weather data to computer system 102 over link 106.

Weather sensors 101 measure atmospheric phenomena at or near the airport where de-iced aircraft await take-off. Weather sensors may also measure atmospheric phenomena in the airport region to provide forecast capability. Weather sensors 101 process these measurements to transfer weather data to computer system 102. This weather data may include the precipitation rate, precipitation type, precipitation accumulation, temperature, dew point, relative humidity, wind speed, wind direction, Doppler radar information, or some other weather measurement.

In some examples, weather sensors 101 include hot plate precipitation rate sensors, although other frozen precipitation rate sensors could be used in other examples. A hot plate sensor heats two plates to the same temperature where the first plate is exposed to precipitation, but the second plate is not exposed to the precipitation. This second plate is typically placed under the first plate, so the second plate is also exposed to ambient temperature and wind, but is shielded from the precipitation. As the precipitation strikes the first plate but not the second, more power is required to maintain the first plate at the same temperature as the shielded second plate. The additional power creates heat to melt snow to liquid and evaporate the liquid from the first plate. The difference in power consumption between the first plate and the second plate corresponds to the precipitation rate. For frozen precipitation, the hot plate sensor provides the liquid equivalent of the frozen precipitation rate. The duty cycle for heating the hot plates may be varied. With a short duty cycle, the hot plates are essentially maintained at a constant temperature with little variation. With a long duty cycle, the plates may repeatedly heat up and cool down, but their power consumption still indicates the precipitation rate. Hot plate precipitation rate sensors are described in U.S. Pat. No. 6,546,353, and commercial hot plate sensors may be obtained from Yankee Environmental Systems, Inc.

Weather sensors 101 may be individual units or may be distributed among multiple components and locations. There could be one or many such sensors. Weather sensors 101 and computer system 102 could be integrated, so that computer system 102 provides some of the processing and user interface functionality typically provided by weather sensors. In some examples, current weather data is transferred from weather sensors 101 to computer system 102 every minute. For frozen precipitation, the weather data may indicate the liquid equivalent of the frozen precipitation rate in millimeters per hour.

User systems 103 provide de-icing information to airport personnel. Typically, user systems 103 include a display or other user interface to convey de-icing information to airport personnel. There could be one or many user systems. Computer system 102 and user systems 103 could be integrated, where some or all of the functionality of computer system 102 is embedded within user systems 103. User systems 103 could be in the de-icing facility, cockpit, control tower, or other location.

Communication links 104–106 could use wireless, metallic, optical, or some other type of data communication mechanism. Communication links 104–106 could use dedicated links or could be a part of a larger communication network. Communication links 104–106 could share some data transfer equipment.

FIG. 2 illustrates computer system 102 in an example of the invention. Computer system 102 includes communication interface 201, processing system 202, and user interface 203. Processing system 202 includes storage system 204. Storage system 204 stores software 205. Processing system 202 is linked to communication interface 201 and user interface 203. Computer system 102 could be comprised of a programmed general-purpose computer, although those skilled in the art will appreciate that programmable or special purpose circuitry and equipment may be used. Computer system 102 may use a client server architecture where operations are distributed among a server system and client devices that together comprise elements 201–205.

Communication interface 201 is coupled to communication links 104–106. Communication interface 201 could comprise a network interface card, modem, port, or some other communication device. Communication interface 201 may be distributed among multiple communication devices. Processing system 202 could comprise a computer microprocessor, logic circuit, or some other processing device. Processing system 202 may be distributed among multiple processing devices. User interface 203 could comprise a keyboard, mouse, voice recognition interface, microphone and speakers, graphical display, touch screen, or some other type of user device. Storage system 204 could comprise a disk, tape, integrated circuit, server, or some other memory device. Storage system 204 may be distributed among multiple memory devices.

Processing system 202 retrieves and executes software 205 from storage system 204. Software 205 may comprise an operating system, utilities, drivers, networking software, and other software typically loaded onto a general-purpose computer. Software 205 could comprise an application program, firmware, or some other form of machine-readable processing instructions. When executed by processing system 202, software 205 directs processing system 202 to operate as described herein.

System Operation—FIG. 3

FIG. 3 illustrates screen display 300 in an example of the invention. The vertical axis represents precipitation rate, and the horizontal axis represents time. The current time is noted at the bottom right of the time axis, and thus, the time to the left of the present time represents time in the past. As time elapses, the present time remains at the right side of the time axis and time in the past moves to the left and eventually off of display 300.

The check time is a time point in the past that indicates whether a de-iced airplane should be checked and possibly de-iced again. If the airplane was de-iced before the check time, then the de-icing treatment has exceeded its capacity and may not remain effective, and the airplane should be checked and possibly de-iced again. If the airplane was de-iced after the check time, then the de-icing treatment should still be effective, and the airplane should be free of dangerous ice formation. The time of a de-icing treatment could be the time when the final step of de-icing is started.

Consider an example where the present time is 4:00 P.M. and the check time is 3:30 P.M. The holdover time is 30 minutes. An airplane that started the final step of de-icing at 3:20 P.M. should be re-checked for ice formation because the final step of de-icing occurred ten minutes before the check time. In contrast, an airplane that started the final step of de-icing at 3:40 P.M. should still be free of dangerous ice formation because the final step of de-icing occurred ten minutes after the check time.

Thus, the check time provides a single value that can be used to clearly assess the current effectiveness of a previous de-icing treatment. If the airplane was de-iced before the check time, then check the airplane and possibly de-ice again. If the airplane was de-iced after the check time, then the airplane should still be free of ice and ready for take off.

Display 300 indicates current values for the de-icing information including the date, present time, check time, holdover time, type of de-icing fluid for the check time, temperature, dew point, relative humidity, wind direction, wind speed, precipitation rate, precipitation intensity, precipitation trend, precipitation type, and precipitation accumulation. The precipitation rate line on display 300 may be color-coded to indicate the type of precipitation. For example, the precipitation rate line could be blue for heavy snow and red for freezing rain. Another section of display 300 could also indicate such conditions through color coding.

The precipitation rate is given in millimeters per hour. For frozen precipitation, the precipitation rate is given by the liquid equivalent of the frozen precipitation in millimeters per hour. The snow intensity is based on the SAE Ground De-icing Committee guidelines: light intensity is from 0 mm/hr to 1 mm/hr; moderate intensity is from 1 mm/hr to 2.5 mm/hr; and heavy intensity is greater than 2.5 mm/hr. The precipitation trend indicates if the precipitation rate has increased, remained steady, or decreased in the last ten minutes.

Display 300 correlates the precipitation rate to the time axis, and indicates the check time, present time, and holdover time on the time axis. Other de-icing information, such as temperature, humidity, and wind speed or direction, could be correlated to the time axis in addition to or as an alternative to the precipitation rate. The display could include selection buttons to allow the user to control which de-icing information is displayed and how the de-icing information is displayed.

Computer system 102 calculates separate check times for multiple de-icing fluids. Examples of de-icing fluids include Octagon Type I or Type IV. Computer system 102 may also calculate check times for a combination of de-icing fluids used in a two-step application. These fluids can be mixed with water (or some other liquid) to form 100%, 75%, 50%, and 25% concentrations. In addition, some de-icing fluids special fluids that are referred to as anti-icing fluids. In the context of the invention, the term "de-icing fluid" means a given de-icing or anti-icing fluid and its concentration. Thus, different concentrations of the same de-icing fluid are considered to be different de-icing fluids in the context of the invention. Also, anti-icing fluids are considered to be de-icing fluids in the context of the invention.

A check time is specific to the type and concentration of the de-icing fluid. Display 300 could have a dialog box or selection buttons for the user to select a specific de-icing fluid to display the check time for the selected de-icing fluid. Alternatively, check times for multiple de-icing fluids could be calculated and displayed simultaneously using color, legends, or patterns for differentiation.

Computer system 102 calculates the check times based on the weather data provided by weather sensors 101, and possibly by weather information systems. In some examples, computer system 102 calculates the check times and updates the display every minute based on new weather data that arrives every minute from weather sensors 101 or from a weather information system. Instead of one minute increments, the transfer of weather data, the calculation of the check times, and the update of the display could occur in real-time or could occur in some other time increment.

To calculate a check time, computer system 102 first determines the precipitation type as either: freezing fog, freezing drizzle, freezing rain, light snow, medium snow, or heavy snow. The determination could be based on input from a weather information system, such as the Automated Surface Observatory System (ASOS), which provides data that indicates if current precipitation is freezing fog, freezing drizzle/rain, or snow. ASOS also indicates whether the snow is light, moderate, or heavy. With respect to snow, ASOS may only be used to indicate the precipitation type, and weather sensors 101 may be used to characterize the snowfall as light, moderate, or heavy. Alternatively, computer system 102 may use weather sensors to determine the precipitation type. For example, if the difference between the temperature and the dew point is less than 4 degrees Fahrenheit and visibility is less than ⅝ of a mile, then precipitation can be classified as freezing fog.

Computer system 102 distinguishes freezing drizzle from freezing rain based on a precipitation rate threshold. If ASOS indicates that the precipitation is freezing drizzle or rain, and if the precipitation rate is above the threshold, then the precipitation type is designated as freezing rain, but if the precipitation rate is below the threshold, then the precipitation type is designated as freezing drizzle.

To calculate the check time, an endurance time is calculated as:

Endurance Time (minutes)=$aS^b(2-T)^c$; where

S (gram/decimeter$^2$/hour)=liquid equivalent of the precipitation rate;

T (Celsius)=temperature; and a, b, and c are constants that are set based on testing to curve fit the data. Each combination of de-icing fluid and precipitation type has its own constants.

Computer system 102 receives S and T from weather sensors 101 or from a weather information service, such as ASOS. For example the precipitation rate for freezing fog may be based on the ASOS identification of precipitation type, and then a translation of the current wind speed to a precipitation rate, since wind is a dominant factor for the freezing fog precipitation rate. The precipitation rate for freezing drizzle may be based on data from a freezing rain sensor that uses a small post stimulated by frequency. As ice forms on the post, the frequency changes, and the slope of the frequency can be translated into a precipitation rate for freezing drizzle. The precipitation rate for freezing rain may be based on the ASOS identification of light, moderate, or heavy, or may be based on data from weather sensors 101. The precipitation rate for snow may be based on the ASOS identification of light, moderate, or heavy, or be based on data from weather sensors 101. Typically, precipitation rates are calculated dynamically based on weather sensors 101.

Computer system 102 performs the endurance time calculations every minute based on current values for precipitation type, S. and T that are received from weather sensors 101 or from a weather information service. A fractional capacity decrease for each minute is determined based on the endurance time, where the fractional capacity decrease is the amount of the de-icing capacity that elapses in one minute. For example, if the endurance time is ten minutes at a specific snowfall rate, the fractional capacity decrease is 1/10 because one tenth of the endurance time will elapse in one minute. Starting from the present time, the fractional capacity decreases are added together going back in time until the minute is found where the total of the fractions equals or exceeds one. The minute back in time where the total of the fractional capacity decreases equals or exceeds one sets the check time and the holdover time. Thus, from the present time, if the 17 fractional capacity decreases from the 17 previous minutes adds to one or more, then the holdover time is 17 minutes and the check time is 17 minutes before the present time.

The above calculation is a best-fit equation that was determined through de-icing fluid testing and multiple non-linear regression to determine endurance time for a given fluid from a given manufacturer as a function of precipitation type, precipitation rate, and temperature. Other calculations could be used in other examples of the invention to determine the check time.

The de-icing information can be provided to various users for display and/or additional processing. For example, the de-icing information could be transferred to ground operation personnel, flight crews, and tower personnel. The de-icing information could be transferred to the cockpit over a wireless link for display to the pilot.

De-icing personnel use a computer system to track when planes are de-iced. The computer system lists the date, flight, plane, gate, type of fluid, and time of de-icing in addition to other data. By comparing this information to the check time for the proper fluid, the computer system could determine if a specific plane on the ground was de-iced before the check time and generate an alarm for that plane. The alarm could be transferred to a display in the cockpit for that aircraft, the control tower, ground operators, and de-icing personnel.

Computer system 102 could also be used to select the proper de-icing fluid or fluids to use. Holdover times for various de-icing fluids could be continually calculated and compared. A calculation that considers the cost of the de-icing fluid, the holdover time, current weather conditions, forecasted weather conditions, and airport take-off schedule (how long are planes waiting to take-off) could be used to suggest the best fluid or fluids to use. Typically, this could involve selecting the cheapest fluid that can provide a long enough holdover time given the weather conditions, forecast, and the airport take-off schedule. For example, if the current delay between de-icing and take-off is ten minutes and the forecast is unchanging, then system 102 would select cheapest de-icing fluid that provides at least ten minutes of holdover time.

In some cases, a two-step de-icing approach is used where a de-icing fluid is applied in the first step, and an anti-icing fluid (a special form of de-icing fluid) is applied in the second step. Computer system 102 could also be used to select the proper de-icing fluids for a two-step application.

Alternatively, the de-icing operator could use computer system 102 to compare de-icing information for several de-icing fluids and select the best one.

To incorporate forecasted data, precipitation rates and temperatures would be projected for future minutes based on the forecasted data. The above calculations could then be used with the projected data to determine how check times are likely to change in the future for various fluids given the forecast. The expected change in check times for a fluid could impact fluid selection.

Consider an example where the expected time between de-icing and take off is 10 minutes, and the holdover time for a given fluid is 12 minutes. The given fluid should remain effective until take off. Now consider that the forecast is for increasing snowfall, and based on the forecast, it is calculated that the holdover time for the given fluid will decrease from 12 minutes to 8 minutes before take off. In this case, the given de-icing fluid, with an expected reduction in holdover time to 8 minutes, will not be effective if the airplane takes off in 10 minutes. System 102 could then select a more effective (and more expensive) de-icing fluid that can handle the forecasted increase in snowfall. System 102 may select a two-step de-icing application in this case.

If desired the functionality of computer system 102 could be integrated into other weather systems that provide weather radar images and other weather data.

In addition, the invention could be applied to non-aircraft de-icing situations, and the invention is not necessarily limited to aircraft de-icing. For example, the invention could be used to determine how long a roadway or runway de-icing treatment remains effective.

Examples of the invention could be used anywhere an applied chemical, biological, or radiological compound, characteristics, or effectiveness is changed when diluted by precipitation.

Advantages

Some implementations of de-icing information system 100 may provide the following advantages (although other implementations may not provide these advantages). System 100 eliminates the manual use of charts to produce the check time, and as a result, system 100 effectively removes human error from check time calculations. System 100 uses specific data inputs instead of data ranges, and as a result, system 100 is able to produce more accurate and more specific de-icing information. System 100 uses weather sensors to determine actual snowfall intensity instead of human visibility estimates, and as a result, system 100 produces more accurate holdover times. System 100 makes continuous calculations and responds to changing weather conditions, so that system 100 is able to safely handle rapid increases or decreases in snowfall that plague current systems. System 100 is also able to select optimum de-icing fluids.

When the advantages are taken together, it is apparent that system 100 is more accurate and timely than prior systems. The improved accuracy and timeliness should reduce unnecessary de-icing treatments and the wasteful use of overly-effective de-icing fluids. More importantly, the improved accuracy and timeliness should better prevent disastrous airplane crashes due to ice formation before take-off.

The invention claimed is:

1. A de-icing information system comprising:

a processing system configured to process weather data indicating precipitation rate and temperature to determine a check time for a de-icing fluid, wherein the de-icing fluid remains effective if applied after the check time, and wherein the de-icing fluid may not remain effective if applied before the check time; and an interface configured to receive the weather data and configured to transfer de-icing information indicating the check time.

2. The de-icing information system of claim 1 further comprising at least one weather sensor configured to detect the precipitation rate and the temperature, and to transfer the weather data indicating the precipitation rate and the temperature.

3. The de-icing information system of claim 2 wherein the at least one weather sensor is configured to detect and transfer the weather data at least once per minute.

4. The de-icing information system of claim 2 wherein the at least one weather sensor includes at least one hot plate precipitation rate sensor.

5. The de-icing information system of claim 1 further comprising a device configured to receive and display the de-icing information.

6. The de-icing information system of claim 5 wherein the display of the de-icing information indicates the check time, the present time, and the holdover time.

7. The de-icing information system of claim 5 wherein the display of the de-icing information indicates the de-icing fluid type and concentration.

8. The de-icing information system of claim 5 wherein the display of the de-icing information indicates the precipitation rate and the temperature.

9. The de-icing information system of claim 5 wherein the display of the de-icing information indicates at least one of: dew point, humidity, wind speed, and wind direction.

10. The de-icing information system of claim 5 wherein the display of the de-icing information indicates at least one of: precipitation intensity, precipitation trend, precipitation type, and precipitation accumulation.

11. The de-icing information system of claim 5 wherein the display of the de-icing information indicates the precipitation rate plotted over time.

12. The de-icing information system of claim 5 wherein the display is located in an airplane cockpit.

13. The de-icing information system of claim 5 wherein the display is located in a de-icing facility.

14. The de-icing information system of claim 5 wherein the display is located in an airport control tower.

15. The de-icing information system of claim 5 wherein the processing system is configured to select the de-icing fluid.

16. The de-icing information system of claim 15 wherein the processing system is configured to select the de-icing fluid based on forecasted weather data.

17. The de-icing information system of claim 1 wherein the processing system is configured to generate an alarm if the de-icing fluid was applied before the check time.

18. A method of operating a de-icing information system, the method comprising:

receiving weather data indicating precipitation rate and temperature;

processing the weather data indicating precipitation rate and temperature to determine a check time for a de-icing fluid, wherein the de-icing fluid remains effective if applied after the check time, and wherein the de-icing fluid may not remain effective if applied before the check time; and transferring de-icing information indicating the check time.

19. The method of claim 18 further comprising:

detecting the precipitation rate and the temperature; and transferring the weather data indicating the precipitation rate and the temperature.

20. The method of claim 19 wherein detecting and transferring the weather data comprises detecting and transferring the weather data at least once per minute.

21. The method of claim 19 wherein detecting the precipitation rate and the temperature comprises using a hot plate precipitation rate sensor.

22. The method of claim 18 further comprising receiving and displaying the de-icing information.

23. The method of claim 22 wherein displaying the de-icing information comprises displaying the check time, the present time, and the holdover time.

24. The method of claim 22 wherein displaying the de-icing information comprises displaying the de-icing fluid type and concentration.

25. The method of claim 22 wherein displaying the de-icing information comprises displaying the precipitation rate and the temperature.

26. The method of claim 22 wherein displaying the de-icing information comprises displaying at least one of: dew point, humidity, wind speed, and wind direction.

27. The method of claim 22 wherein displaying the de-icing information comprises displaying at least one of: precipitation intensity, precipitation trend, precipitation type, and precipitation accumulation.

28. The method of claim 22 wherein displaying the de-icing information comprises displaying the precipitation rate plotted over time.

29. The method of claim 22 wherein displaying the de-icing information comprises displaying the de-icing information in an airplane cockpit.

30. The method of claim 22 wherein displaying the de-icing information comprises displaying the de-icing information in a de-icing facility.

31. The method of claim 22 wherein displaying the de-icing information comprises displaying the de-icing information in an airport control tower.

32. The method of claim 18 further comprising selecting the de-icing fluid.

33. The method of claim 32 wherein selecting the de-icing fluid comprises selecting the de-icing fluid based on forecasted weather data.

34. The method of claim 18 further comprising generating an alarm if the de-icing fluid was applied before the check time.

35. A product for a de-icing information system, the product comprising:
    software configured to direct a processing system to process weather data indicating precipitation rate and temperature to determine a check time for a de-icing fluid, wherein the de-icing fluid remains effective if applied after the check time, and wherein the de-icing fluid may not remain effective if applied before the check time; and
    a storage system that stores the software.

36. The product of claim 35 wherein the software is configured to direct the processing system to process the weather data and determine the check time for the de-icing fluid at least once per minute.

37. The product of claim 35 wherein the software is configured to direct the processing system to generate a display signal that causes a display to display the de-icing information.

38. The product of claim 37 wherein the display of the de-icing information indicates the check time, the present time, and the holdover time.

39. The product of claim 37 wherein the display of the de-icing information indicates the de-icing fluid type and concentration.

40. The product of claim 37 wherein the display of the de-icing information indicates the precipitation rate and the temperature.

41. The product of claim 37 wherein the display of the de-icing information indicates at least one of: dew point, humidity, wind speed, and wind direction.

42. The product of claim 37 wherein the display of the de-icing information indicates at least one of: precipitation intensity, precipitation trend, precipitation type, and precipitation accumulation.

43. The product of claim 37 wherein the display of the de-icing information indicates the precipitation rate plotted over time.

44. The product of claim 37 wherein the display is located in an airplane cockpit.

45. The product of claim 37 wherein the display is located in a de-icing facility.

46. The product of claim 37 wherein the display is located in an airport control tower.

47. The product of claim 35 wherein the software is configured to direct the processing system to select the de-icing fluid.

48. The product of claim 47 wherein the software is configured to direct the processing system to select the de-icing fluid based on forecasted weather data.

49. The product of claim 35 wherein the software is configured to direct the processing system to generate an alarm if the de-icing fluid was applied before the check time.

* * * * *